(12) United States Patent
Kasperchik et al.

(10) Patent No.: US 8,668,966 B2
(45) Date of Patent: Mar. 11, 2014

(54) PRINTING METHOD

(75) Inventors: Vladek Kasperchik, Corvallis, OR (US); Vladimir Jakubek, Corvallis, OR (US); Jayprakash C. Bhatt, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 277 days.

(21) Appl. No.: 13/352,579

(22) Filed: Jan. 18, 2012

(65) Prior Publication Data

US 2013/0183501 A1    Jul. 18, 2013

(51) Int. Cl.
*B41M 5/50*    (2006.01)

(52) U.S. Cl.
USPC ............. 428/32.32; 106/31.65; 106/31.9; 346/135.1; 427/265

(58) Field of Classification Search
USPC ......... 428/32.32; 106/31.65, 31.9; 346/135.1; 427/265
See application file for complete search history.

(56) References Cited

U.S. PATENT DOCUMENTS

| | | |
|---|---|---|
| 7,615,111 B2 | 11/2009 | Oriakhi |
| 7,621,629 B2 | 11/2009 | Makuta et al. |
| 7,891,799 B2 | 2/2011 | Edwards et al. |
| 7,923,083 B2 | 4/2011 | Tojo et al. |
| 2010/0203093 A1 | 8/2010 | Bujard et al. |

FOREIGN PATENT DOCUMENTS

| | | |
|---|---|---|
| WO | WO 2010/028285 | 3/2010 |
| WO | WO 2010/123504 | 10/2010 |

*Primary Examiner* — Bruce H Hess

(57) ABSTRACT

A method for producing printed articles that encompasses providing a first ink composition that contains metal oxide particles with an average particle size in the range of about 3 to about 300 nm; providing a second ink composition that contains colored pigments dispersed in an ink vehicle; providing a printable media having a bottom supporting substrate and an ink-absorbing layer with pore diameters that are smaller than the size of the metal oxide pigment particles and colored pigments; and sequentially applying, on the same print area, the first and the second ink compositions onto said printable media. Also disclosed herein are the printed articles obtained according to the present method.

15 Claims, 3 Drawing Sheets

PRINTING METHOD

BACKGROUND

Inkjet technology has expanded its application to high-speed, commercial and industrial printing, in addition to home and office usage, because of its ability to produce economical, high quality, multi-colored prints. This technology is a non-impact printing method in which an electronic signal controls and directs droplets or a stream of ink that can be deposited on a wide variety of substrates. Current inkjet printing technology involves forcing the ink drops through small nozzles by thermal ejection, piezoelectric pressure or oscillation, onto the surface of a media. In inkjet printing method, both the media and the ink play a key role in the overall image quality and permanence of the printed images and articles. Thus, it has often created challenges to find media and ink which can be effectively used with such printing techniques and which imparts good image quality. In addition, nowadays, prints and printed articles with specific characteristics and appearances are often wanted.

As expanded colors and appearances are sought for home and office decorative printing, developments have been made to provide printed articles with specific features, such as for examples, metallic appearances and/or reflectivity. However, method, inks and printed articles with such specific features are noticeably limited among available options due, for examples, to the cost or to the ineffectiveness for home and office use. Accordingly, investigations continue into developing printing methods and/or printed articles that exhibit specific properties such as, for example, metallic luster and/or variable color appearances.

BRIEF DESCRIPTION OF THE DRAWING

The drawings illustrate various embodiments of the present system and method and are part of the specification.

DETAILED DESCRIPTION

Figure 1:
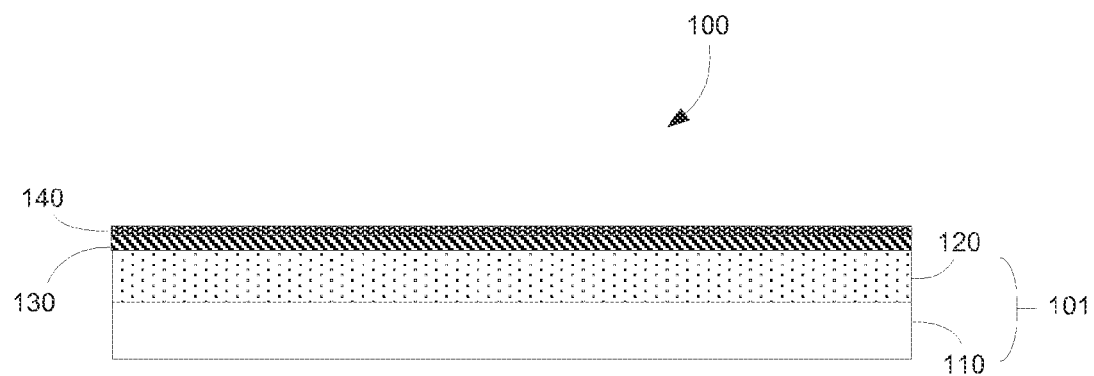
FIGS. 1, 2 and 3 are cross-sectional views of printed article and its printing method, according to some embodiments of the present disclosure.

Before particular embodiments of the present disclosure are disclosed and described, it is to be understood that the present disclosure is not limited to the particular process and materials disclosed herein. It is also to be understood that the terminology used herein is used for describing particular embodiments only and is not intended to be limiting, as the scope of protection will be defined by the claims and equivalents thereof. In describing and claiming the present article and method, the following terminology will be used: the singular forms "a", "an", and "the" include plural referents unless the context clearly dictates otherwise. Thus, for example, reference to "a pigment" includes reference to one or more of such materials. Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For examples, a weight range of about 1 wt % to about 20 wt % should be interpreted to include not only the explicitly recited concentration limits of 1 wt % to 20 wt %, but also to include individual concentrations such as 2 wt %, 3 wt %, 4 wt %, and sub-ranges such as 5 wt % to 15 wt %, 10 wt % to 20 wt %, etc. All percents are by weight (wt %) unless otherwise indicated.

The disclosure describes a method of producing printed articles with metallic luster and variable color appearance. Such method encompasses applying, sequentially, on the same print substrate area, two different ink compositions, herein called first ink composition and second ink composition. The method encompasses providing a first ink composition that contains metal oxide particles with an average particle size in the range of about 3 to about 300 nm; providing a second ink composition that contains colored pigments dispersed in an ink vehicle; providing a printable media having a bottom supporting substrate and an ink-absorbing layer with pore diameters that are smaller than the size of metal oxide pigment particles and colored pigment particles; and sequentially applying, on the same print area, the first and the second ink compositions onto said printable media. The present disclosures also describes the printed article, resulting from said method, having a metallic luster and variable colored appearance. Said article encompasses a printable media on which a printed feature has been formed by applying, on the same print area, the first and second ink compositions.

The first ink composition can be called "metallic luster" ink and is based on dispersed conductive metal oxide particles. The second ink composition is a colored ink that contains colored pigment particles. Both the first and second inks are sequentially jetted onto a printable media, or onto an inkjet paper substrate, having a micro-porous absorptive surface. The pores, that are present on the printable media, are small enough to retain the metal oxide particles, part of the first ink composition, and the colored pigment particles, part of the second ink composition, on the media surface while absorbing ink vehicles of the first and second ink composition into the media.

The printing method, as described herein, enables the production of printed articles having a wide variety of different metallic colors while utilizing single "metallic luster" metal oxide ink composition and colored pigment-based ink composition. The printing method can be a digital technology and can be considered as a "color-on-demand" flexibility: i.e. color can easily be changed or modified. The printing method enables hue flexibility of metallic prints by overlaying on the same print area using two different types of ink. The resulting printed article may have thus a reflective "metallic" appearance with hue highly dependent on color of the pigment-based ink, content in it and ratio of both ink in different amounts (metal oxide and pigment-based one). The method has the ability to produce inkjet prints with wide variety of different metallic colors and enables the creation of text and graphic prints with metallic color appearance on paper-like substrates.

The Printing Method

The method for producing printed articles having a metallic luster and a variable color appearance, encompasses providing a first ink composition, that contains metal oxide particles that have an average particle size in the range of about 3 to about 300 nm; providing a second ink composition, that contains colored pigment particles dispersed in an ink vehicle; providing a printable media, which contains a bottom supporting substrate and an ink-absorbing layer with pore diameters that are smaller than the size of the metal oxide pigment particles and colored pigment particles; and sequentially applying, on the same print area, the first and second ink compositions onto said printable media. In some examples, both the first and the second ink compositions are inkjet compositions; it means thus that said ink compositions are well adapted to be used in an inkjet device and/or in an inkjet printing process. Said ink compositions may be established on the material via any suitable inkjet printing technique. Non-limitative examples of such inkjet printing technique include thermal, acoustic, continuous and piezoelectric inkjet printing.

By inkjet printing technique, it is meant herein that the ink is applied using inkjet printing devices. Within inkjet printing devices, liquid ink drops are applied in a controlled fashion to a print medium by ejecting ink droplets from a plurality of nozzles, or orifices, in a printhead of an ink jet printing device or inkjet printer. In some examples, ink compositions may be dispensed from any piezoelectric or drop-on-demand inkjet printing devices. Such inkjet printing devices can be available from Hewlett-Packard Inc., Palo Alto, Calif., by way of illustration and not limitation. In drop-on-demand systems, a droplet of ink is ejected from an orifice directly to a position on the surface of a print medium by pressure created by, for example, a piezoelectric device, an acoustic device, or a thermal process controlled in accordance digital data signals. An ink droplet is not generated and ejected through the orifices of the printhead unless it is needed. The volume of the ejected ink drop is controlled mainly with a print head. The printed or jetted ink may be dried after jetting the ink composition in a predetermined pattern onto a surface of a print medium. The drying stage may be conducted, by way of illustration and not limitation, by hot air, electrical heater or light irradiation (e.g., IR lamps), or a combination of such drying methods. In order to achieve best performance it is advisable to dry the ink at a maximum temperature allowable by the print medium that enables good image quality without print medium deformation. In some examples, a temperature during drying is about 40° C. to about 150° C.

Figure 2:
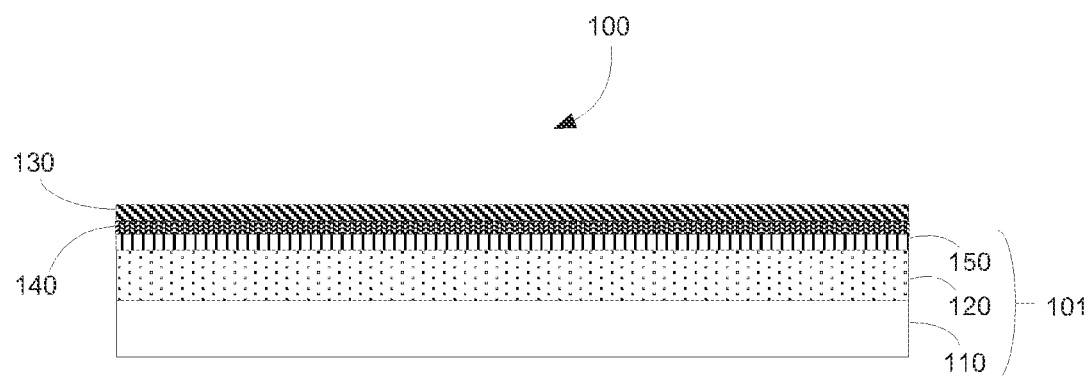

FIG. 1 and FIG. 2 illustrate the printed article (100) resulting from the printing method according to the present disclosure. Such printed article (100) includes a printable media (101), a metal oxide coating layer (130) and a colored pigment layer (140). As illustrated in FIG. 1, said printable media (101) encompasses a bottom supporting substrate (110) and an ink-absorbing layer (120). Such as illustrated in FIG. 2, the printable media (101) can further includes a glossy layer (150) that is located above the ink-absorbing layer (120). The printed article (100) encompasses a metal oxide coating layer (130), containing the first ink composition, which is applied over the ink-absorbing layer (120), or, when present, over the glossy layer (150) of the printable media (101). The printed article (100) further encompasses a colored pigment layer (140), containing the second ink composition, which has been deposited above the metal oxide coating layer (130), such as illustrated in FIG. 1, or below the metal oxide coating layer (130), such as illustrated in FIG. 2. The printed article (100) contains, thus, a metal oxide coating layer (130) that is deposited at the surface of the ink-absorbing layer (120) and a colored pigment layer (140), which lies substantially directly below or above the metal oxide coating layer (130).

The metal oxide coating layer (130) and the colored pigment layer (140) are applied on the coated side of the printable media (101). If said coated side is used as an image-receiving side, the other side, i.e. backside, may not have any coating at all, or may be coated with other chemicals (e.g. sizing agents) or coatings to meet certain features such as to balance the curl of the final product or to improve sheet feeding in printer. In some examples, ink-absorbing layers are applied to both opposing sides of the supporting substrate (110). The double-side coated medium has thus a sandwich structure, i.e. both sides of the supporting substrate (110) are coated with the same coating and both sides may be printed with metal oxide coating layers (130) and with and the colored pigment layers (140).

Figure 3:
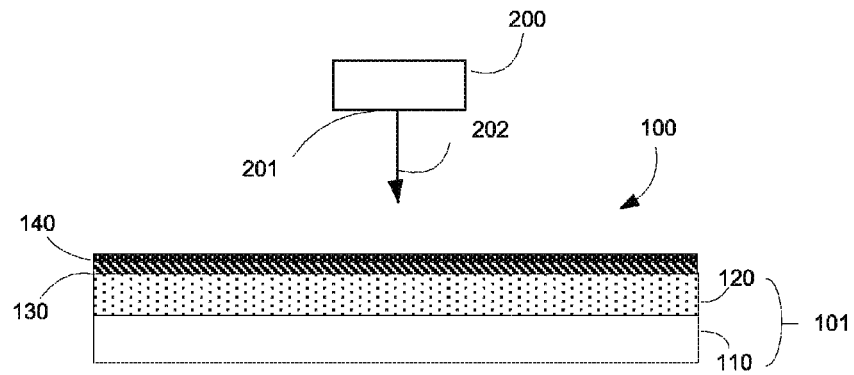

FIG. 3 illustrates an example of the method according to the present disclosure and an example for forming the printed article (100). In such method, the printer (200) has, at least, one orifice (201) that dispenses droplets of the first and of the second ink compositions, in accordance with the principles described herein, along a trajectory (202) to the surface of the printable media (101) in view of forming a printed feature. Said printed feature encompasses a metal oxide coating layer (130) and a colored pigment layer (140) retained at the surface of the ink-absorbing layer (120). As illustrated in FIG. 3, if the first ink composition is jetted first, the colored pigment layer (140) will be deposited above the metal oxide coating layer (130). On the other hand, if the second ink composition is jetted first, the colored pigment layer (140) will be deposited on the ink-receiving layer (120).

Figure 4:
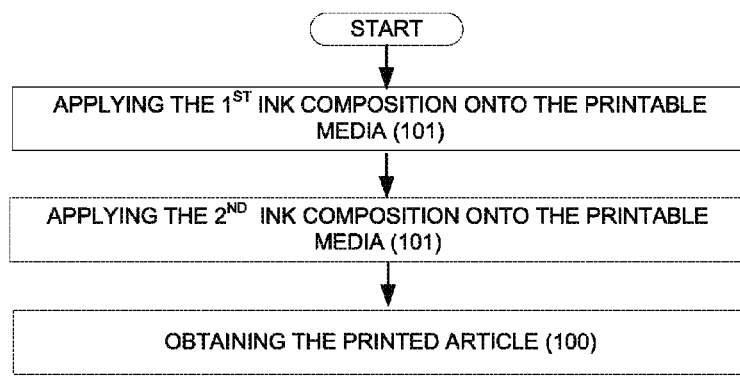
FIGS. 4 and 5 are flowcharts illustrating methods for producing printed articles according to some embodiments of the present disclosure.
Figure 5:
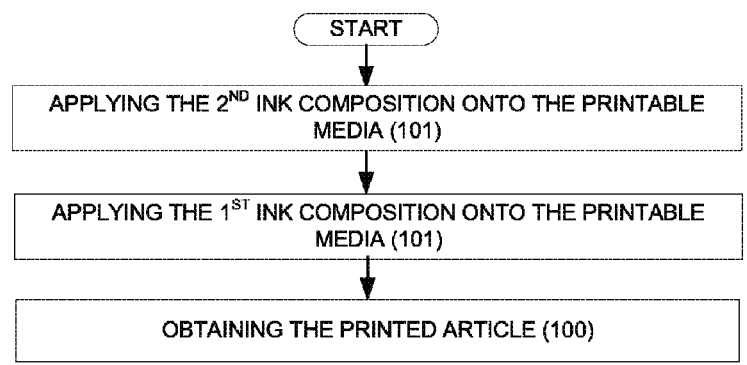

In some examples, such illustrated in the FIG. 4, the first ink composition, containing metal oxide particles with an average particle size in the range of about 3 to about 300 nm, is applied before the second ink composition, containing colored pigments dispersed in an ink vehicle, on the same print area of the printable media (101) in view of obtaining the printed article (100) such as illustrated in FIG. 1. In some other examples, such as illustrated in the FIG. 5, the second ink composition, containing colored pigments, is applied first and then the first ink composition, containing metal oxide particles, is applied, on the same print area of the printable media (101), in view of obtaining the printed article (100) such as illustrated in FIG. 2. The projection of the stream of droplets of both the first and the second inkjet compositions, onto the printable media, can be done via inkjet printing technique.

Both the first and of the second ink compositions are jetted onto the surface of the printable media (101), which contains a bottom supporting substrate (110), an ink-absorbing layer (120) and, optionally, a glossy layer (150). The surface pore sizes of ink-absorbing layer (120), and, when present, of the glossy layer (150), are small enough to retain practically all metal oxide pigment particles and colored pigment particles on the surface while, in the same time, absorbing the liquid phases of both ink compositions into the media.

The ink fluxes for both the first and second ink compositions may vary. The sequential flux of both the first and second ink compositions, i.e. total flux, that is applied on the printable media during the printing process is tower than the absorptive capacity of the printable media. Such absorptive capacity varies for different porous media designs but can be in the range of between 90 and 180 pL/300$^{th}$ pixel. In some examples, the total ink flux is below 100% of the printable media absorbing capacity and, in some other example, is below or equal to 80% of the printable media absorbing capacity. The time gap between the application of the first and second ink composition is long enough to enable formation of two distinct layers on to the printable media and is long enough to prevent mixing of color pigment and metal oxide within the same layer. In some examples, the time gap can be below 50 or 100 milliseconds.

In some examples, the ink flux per unit area of the printable media is high enough for complete (or nearly complete) overlap of the drops and formation of uniform reflective metal oxide particles layer. The values of optimal ink limit are dependent on spreading ability of the ink (its dynamic surface tension) as well as on properties of the substrate metal oxide composition that is printed onto, i.e. its porosity, surface energy, etc. In some examples, when the metal oxide particles is $Fe_3O_4$ particles and represents from about 1.5 to about 2.5 wt % by total weight of the ink composition; the first ink composition jetting limits is ranging from about 35 to about 120 pL/300th pixel (1/300×1/300 inch square or 4800 to 17000 pL/mm$^2$).

In some examples, the jetting of the first ink composition that contains metal oxide particles and the jetting of the second ink composition that contains colored pigments dispersed in an ink vehicle, on the same media area, results in printed articles with metallic color appearance. In the printed media, the liquid phase of the first and of the second ink composition migrates into the ink-absorbing layer (120) of the printable media while metal oxide particles and colored pigments form two distinctive layers on the print surface. Absorption of the liquid phases of both ink compositions into media porosity and retention of the particles and pigments on the surface, results in the formation of a print surface with a highly planarized metal oxide layer (130) and of a subsequent colored pigment layer (140). The different kinds of colorants (metal oxides and pigments) in the resulting printed article are thus spatially separated: the colored pigments are present in a distinct layer from the metal oxide particles. Such combination of color and aspect provided by the reflective metal oxide layer (130) and by the colored pigment layer (140) results in a printed article with metallic luster and variable color appearance. The variable color is dependant of the color of the pigment layer (140), i.e. of the nature of the pigment present in the second ink composition, as well as of jetting order of the inks.

Printed Article

The method described herein result in printed article having a metallic color appearance. Said appearance is the result of light directional reflection from the combination of metallic layer (130) and media surface, as well as from the diffuse light reflection coming from the colored layer (140). In some examples, when the first ink composition is jetted first, the colored pigments of the second ink composition are stacked on top of the smaller metal oxides particles layer and form an optically uniform and smooth color layer on top of the reflective metal oxide layer. In some other examples, when the second ink composition, containing colored pigments, is jetted first, the smaller metal oxide particles end-up on the surface of the larger colored pigment particles of colored pigment layer. Metal oxide particles may fill gaps/voids between larger pigment particles and produce print with more smooth surface but "rougher" metal oxides/color pigments reflective interface.

The first ink composition, containing metal oxide particles, forms thus onto the above-mentioned printable media, a layer (130) that can be considered as a metal oxide coating. Said layer is a thin, transparent or semi-transparent continuous or almost continuous metal oxide layer (130). In some examples, for optimum metallic appearance, said layer (130) is a planarized optically reflective layer that encompasses metal oxide particulates, with a thickness that is in the range of about 1 and about 600 nm, or, between about 3 and about 300 nm. In some examples, the metal oxide coating has a density in the range about 3 to about 80 µg/cm$^2$ or a density in the range of about 10 to about 40 µg/cm$^2$. The reflective layer (130) is optically transparent or semi-transparent. Said transparency allows indeed seeing the colored pigmented layer (140). In some examples, the reflectivity of the color pigment layer (140) is lower than the reflectivity of the metal oxide layer (130).

The second ink composition, containing colored pigment particles, forms onto the above-mentioned printable media, a colored layer (140). Said colored layer (140) may or may not form a continuous colored layer (140) on the media. Said layer is a planarized optically reflective layer (140), which encompasses colored pigment particulates, with a thickness that is in the range of about 1 and about 600 nm, or, between about 3 and about 300 nm. In some examples, the colored layer (140) has a density in the range about 3 to about 80 µg/cm$^2$ or a density in the range of about 10 to about 40 µg/cm$^2$.

In some examples, the first ink composition forms, onto the printable media (101), a metal oxide coating layer (130) that has a thickness that is between about 1 nm and about 600 nm. In some other examples, the second ink composition forms, onto the printable media (101), a colored pigment layer (140) that has a thickness that is between about 1 nm and about 600 nm. In some examples, the printed article (100) encompass a metal oxide coating layer (130) at the surface of the ink-absorbing layer (120) of the printable media (101) and a colored pigment layer (140) located above the metal oxide coating layer (130). In some other examples, the printed article (100) encompass a colored pigment layer (140) at the surface of the ink-absorbing layer (120) of the printable media (101) and a metal oxide coating layer (130) above the colored pigment layer (140). Such combination of color and aspect provided by the reflective metal oxide layer (130) and by the colored pigment layer (140) results in a printed article with metallic luster and variable color appearance. The variable color is dependant of the color of the area (140), i.e. the nature of the colorant present in the second ink composition.

In some embodiments, the printed article (100) that results from the printing method described herein has a metallic luster and variable colored appearance. Said printed article (100) has a uniform coating with strong sparkling, metallic, and metallic reflective appearance. Said printed article (100) encompass a printable media (101) on which a printed feature has been formed by applying, on the same print area, a first and a second ink compositions. Said first ink composition contains metal oxide particles that have an average particle size in the range of about 3 to about 300 nm and forms a metal oxide coating layer (130). The second ink composition contains colored pigments dispersed in an ink vehicle and forms a colored pigment layer (140). Said printable media (101) contains a bottom supporting substrate (110) and an ink-absorbing layer (120) with pore diameters that are smaller than the size of the metal oxide pigment particles and smaller than the size of the colored pigment particles. Said printable media (101) can also contain a glossy layer (150) with pore diameters that are smaller than the size of the metal oxide pigment particles and smaller than the size of the colored pigment particles. Colored pigment particles and metal oxide pigment particles, which are part of the first and second ink composition, are large enough to stay on media surface.

By "metallic luster", it is meant herein that the printed article has an opaque or a semi-opaque appearance and directional reflects the light as a metal surfaces reflect it. The printed article interacts with the light and has a shiny metal appearance. The printed article has specific optical properties: it exhibits a sort of glow from reflected light and has the tendency to reflect at specular angle when exposed to directional light source. The printed article can have a gold appearance. By "gold-like appearance", it is meant herein that the printed article has a visual appearance of gold-plated surface and has the color of metallic gold (Au). However, the printed article does not contain any gold or other elemental metal particles. The printed article exhibits thus gloss and sheen as a gold object does. By "variable colored appearance", it is meant herein that the printed article could have different color, such colors being variable and dependant of the color of the pigmented layer (140), i.e. the nature of the pigment present in the second ink composition. In some examples, the colored pigment layer (140) contains pigments that are selected from the group consisting of yellow, cyan, magenta pigments, and combinations of two or more of the above. The colored appearance could then be slightly yellow, cyan, magenta, or any other colors resulting from the combination of the above-mentioned pigments. The printed article of the present disclosure can be useful for forming printed images that have, for examples, decorative applications, such as greeting cards, scrapbooks, brochures, book covers, signboards, business cards, certificates and other like applications. In some other examples, such printed article can be used as printed media used in printing technique.

Figure 6:
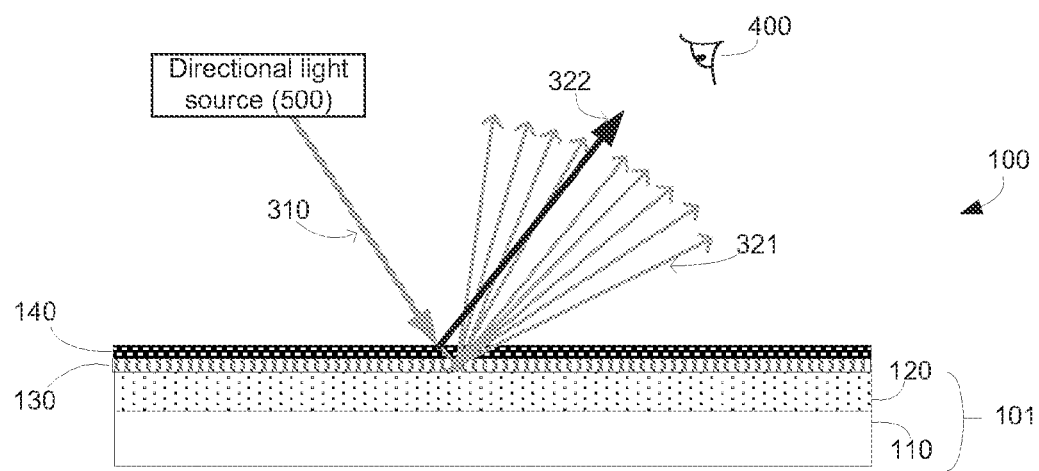
FIGS. 6 and 7 are cross-sectional views of printed article according to some embodiments of the present disclosure when light is applied thereon.
Figure 7:
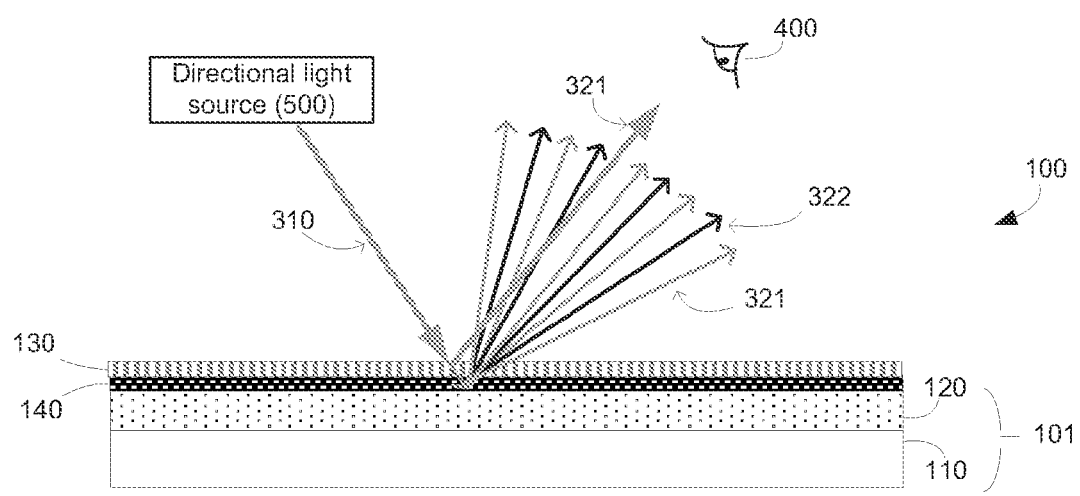

FIG. 6 and FIG. 7 illustrate the effect of light on the printed article (100) such as described herein. The incident light (310), originating from a directional light source (500), is applied to the printed article (100) and becomes reflected light (321 and 322). Said printed article (100), that encompasses a metal oxide coating layer (130) and colored pigment layer (140) applied over the printable media (101), reflect the incident light (310) onto a reflected light (321 and 322). The sequence of putting down a reflective metal oxide coating layer (130) impact significantly the print appearance at specular viewing angles (400).

The combination of the metal oxide coating layer (130), based on the first ink composition, with the colored pigment layer (140), based on the second ink composition, that are applied to the ink-absorbing layer of the printable media, affects both produced print reflectivity and metallic appearance as well as hue of the metallic print (especially when viewed at specular angle). Indeed, metal oxide coating layer (130) and colored pigment layer (140) have different light reflectivity. The reflectivity of the metal oxide coating layer is superior to the colored pigment layer but is still partially transparent and may act as semi-transparent mirror. The absorptive color of the metal oxide coating layer (130) and colored pigment layer (140) are often different as the mean particle size of metal oxide particles and of the colored pigments are likely to be different. Difference in particle sizes of materials in both layers may significantly affect the way light is reflected off the print surface as well as from the interface between metal oxide particles and colored pigments layers. Different thickness of the metal oxide layer and colored pigment layer results in different overall reflective appearance of the printed object.

The First Ink Composition

The first ink composition, also called "metallic luster" ink composition, is based on dispersed metal oxide particles. The "metal oxide particles" are nanoparticles that have size in a range such that they are substantially transparent to the naked eye. The metal oxide particles are either colorless or have rather weak coloration in thin layers. Said metal oxide particles have an average particle size in the range of about 3 to about 300 nm. The average size of the metal oxide particles may also be in the range of about 10 to about 100 nm; in some other examples, in the range of about 20 to about 60 nm. The refractive index of the metal oxide particles can be equal or higher than 1.2. In some examples, the refractive index of the metal oxide particles is in the range of about 1.5 to about 3.0. The refractive index, or index of refraction, is a measure of the speed of light in metal oxide particles. It is expressed as a ratio of the speed of light in vacuum relative to that in the particles medium.

Metal oxide particles include metal oxide pigments selected from the group consisting of titanium dioxide ($TiO_2$), in rutile or anatase crystalline form, zinc oxide (ZnO), indium oxide ($In_2O_3$), manganese oxide ($Mn_3O_4$) and iron oxide ($Fe_3O_4$). In some examples, the metal oxide particles are iron oxide ($Fe_3O_4$) or manganese oxide ($Mn_3O_4$) particles. In some other examples, the first ink composition contains iron oxide ($Fe_3O_4$) as metal oxide particles. As "iron oxide", it is meant herein any chemical compounds composed of iron and oxygen. The term iron oxide encompasses thus different iron oxides, iron hydroxides or oxide/hydroxides. Examples of iron oxides include iron (II) oxide (wüstite, FeO), iron (II, III) oxide (magnetite, $Fe_3O_4$) and iron (III) oxide (hematite, $Fe_2O_3$). Examples of iron hydroxides include iron (II) hydroxide ($Fe(OH)_2$) and iron (III) hydroxide ($Fe(OH)_3$). In some examples, the first ink composition contains magnetite ($Fe_3O_4$) as metal oxide particle.

Metal oxide particles might have a light absorptivity that is similar to that of metals. In some examples, inks based on dispersions of these materials may form coatings with reflectivity up to 10% (or even higher) and with a visual appearance of metallic films. When printed articles are made with a first ink composition containing $Fe_3O_4$ particles, such printed articles may have visual appearance of gold. In some embodiments, the metal oxide particles are dispersed in a liquid carrier in view of forming a jettable ink composition that is suitable for inkjet printing. In some examples, the ink composition is an inkjet ink composition that contains, at least, metal oxide particles and an aqueous carrier. In some other examples, the ink composition contains a metal oxide, a dispersant and a liquid carrier. The amount of the metal oxide particles, present in the first ink composition, can represent from about 0.1 to about 30 wt % of the total weight of the ink composition. In some examples, the amount of metal oxide particles represents from about 0.5 to about 20 wt %, and, in some other examples, from about 1 to about 10 wt % by total weight of the ink composition. In some embodiments, the metal oxide particles is $Fe_3O_4$ particles and represents from about 1.5 to about 5 wt % by total weight of the ink composition.

In some examples, the first ink composition also contains a dispersant in an amount sufficient to achieve a predetermined jetting reliability for the ink composition; i.e. the metal oxide particles, present in the first ink composition, are dispersed with dispersants. Examples of suitable dispersants include, but are not limited to, water-soluble anionic species of low and high molecular weight such as phosphates and polyphosphates, phosphonates and polyphosphonates, phosphinates and polyphosphinates, carboxylates (for example, citric acid or oleic acid), polycarboxylates (for example, acrylates and methacrylates), hydrolysable alkoxysilanes with alkoxy group attached to water-soluble (hydrophilic) moieties such as water-soluble polyether oligomer chains (for example, polyether alkoxysilanes). The dispersant can be reactive silane coupling agents containing hydrophilic functional groups, such as amino, diamino, triamino, ureido, poly (ether), mercapto, glycidol functional groups and their hydrolysis product. Examples of silane coupling agents suitable as dispersants for metal oxide particles are (aminoethyl) aminopropyl-triethoxysilane, (aminoethyl)aminopropyl-tnmethoxysilane, (aminoethyl)aminopropyl-methyldimethoxysilane, aminopropyl-triethoxysilane, aminopropyl-triethoxysilane, glycidolpropyl-trimethoxysilane, ureidopropyltnmethoxysilane and polyether-triethoxysilane, polyether-trimethoxysilane hydrolysis product of aminopropyl-trimethoxysilane and hydrolysis product of (aminoethyl)minopropyl-trimethoxysilane. In some examples, the dispersant used in the first ink composition, to disperse metal oxide particles, is a polyether alkoxysilane dispersant.

The amount of dispersant in the first ink composition is dependent, for example, on one or more of the nature of the dispersant, the nature and the amount of the metal oxide, the nature of the ink-receiving layer, and the nature of the jetting instrument. In some examples, the amount of dispersant may vary from about 1 wt % to about 300 wt % of the dispersed metal oxide particles content. In some examples, the dispersant content range is between about 2 and about 150 wt %, or, in some other examples, is between about 5 and about 100 wt % of the metal oxides particles content.

In some examples, the first ink composition contains magnetite ($Fe_3O_4$) as metal oxide particles, dispersed in an aqueous liquid vehicle. The dispersion of iron oxide particles, such as $Fe_3O_4$, can be prepared via milling or dispersing $Fe_3O_4$ powder in water in the presence of suitable dispersants. The metal oxide dispersion, may be prepared by milling commercially available inorganic oxide pigment having large particle size (in the micron range) in the presence of the dispersants, described above, until the desired particle size is achieved. The starting dispersion to be milled is an aqueous dispersion with solid content up to 40% by weight of the metal oxide pigment. The milling equipment that can be used is a bead mill, which is a wet grinding machine capable of using very fine beads having diameters of less than 1.0 mm as the grinding medium, for example, Ultra-Apex Bead Mills from Kotobuki Industries Co Ltd. The milling duration, rotor speed and temperature may be adjusted as known to those skilled in the art to achieve the results desired.

The Second Ink Composition

The second ink composition includes one or more pigments that impart the desired color to said ink and to the colored pigment layer (140). As used herein, "pigment" refers to a colorant particle that is substantially insoluble in the liquid vehicle in which it is used. The phrase "substantially insoluble" means that the pigment is not dissolved into the liquid vehicle and is not absorbed by the ink-receiving layer of the printable media. On the other hand, said colorant is retained on the surface of the ink-receiving layer (120) or on the surface of the metal oxide layer (130) as distinguished from the liquid phase presents in the inks. The pigments have an impact on directional surface reflectivity of a printed medium.

Pigments that can be used include both self-dispersed pigments as well as dispersed pigments. "Dispersed pigments" refer to pigments dispersed by a separate dispersing agent that is not covalently attached to the surface. "Self-dispersed" refers to pigments that have been functionalized with a dispersing agent, such as by chemical attachment of the dispersing agent to the surface of the pigment. The dispersing agent can be a small molecule or a polymer or oligomer. The dispersing agent can be attached to such pigments to terminate the outer shell of the pigment with a charge, thereby creating a repulsive nature that reduces agglomeration of pigment particles within the liquid vehicle. If self-dispersed, a dispersant can be prepared in a precursor form, and then the precursor is attached to the pigment to chemically modify the surface of the pigment. Dispersant can also be attached to the pigment using various precursor materials, such as para-aminobenzoic acids, isophthalic acids, tricarboxylic acids, carboxylic groups, sulfonylic groups, phosphates, oligomers, polymers, and isomers thereof, for example. Such pigments can be manufactured by a variety of known methods such as channel methods, contact methods, furnace methods, acetylene methods, or thermal methods, and are commercially available from vendors such as Cabot Corporation, Columbian Chemicals Company, Evonik, Mitsubishi, and E.I. DuPont de Memours and Company.

The second ink composition contains colored pigments, such as, for examples, cyan, magenta, yellow, blue, orange, red, green, pink or black pigments. The second ink composition can contain combinations of two or more of said colored pigments. Suitable pigments include, for example, azo pigments including diazo pigments and monoazo pigments, polycyclic pigments (e.g., phthalocyanine pigments such as phthalocyanine blues and phthalocyanine greens, perylene pigments, perynone pigments, anthraquinone pigments, quinaeridone pigments, dioxazine pigments, thioindigo pigments, isoindolinone pigments, pyranthrone pigments, and quinophthalone pigments), nitropigments, nitroso pigments, anthanthrone pigments such as PR168, and the like. Representative examples of phthalocyanine blues and greens include copper phthalocyanine blue, copper phthalocyanine green and derivatives thereof (Pigment Blue 15 and Pigment Green 36). Representative examples of quinacridones include Pigment Orange 48, Pigment Orange 49, Pigment Red 122, Pigment Red 192, Pigment Red 202, Pigment Red 206, Pigment Red 209, Pigment Violet 19 and Pigment Violet 42. Representative examples of anthraquinones include Pigment Red 43, Pigment Red 194, Pigment Red 177, Pigment Red 216 and Pigment Red 226. Representative examples of perylenes include Pigment Red 123, Pigment Red 190, Pigment Red 189 and Pigment Red 224. Representative examples of thioindigoids include Pigment Red 86, Pigment Red 87, Pigment Red 198, Pigment Violet 36, and Pigment Violet 38. Representative examples of heterocyclic yellows include Pigment Yellow 1, Pigment Yellow 12, Pigment Yellow 13, Pigment Yellow 14, Pigment Yellow 17, Pigment Yellow 73, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in powder, press cake or dispersion form from a number of sources. Examples of black pigment suitable, for use in the second ink composition, include, but are not limited to, commercially available carbon black pigments such as Color Black FW 200, Color Black FW 2V, Color Black FW1, Color Black FW 18, Color Black FW S160, Color Black FW S170, Printex including 95, 85, 75, 55, 45, 300, 35, 25, 200, 12, and Special Blacks including, 4A, 4, 5, 6, 550, 350, 250; BP1100, BP900, BP800, M1100, M900, M800, Monarch 1400, Monarch 1300, Monarch 1000, Monarch 900, Monarch 880, and Monarch 700; Cab-O-Jet 200 and Cab-O-Jet 300; Raven 2500ultra, Raven 2000, Raven 7000, Raven 5750, Raven 5250, Raven 5000, and Raven 3500; 45 B, and combinations thereof.

The pigments have a particle size ranging from about 50 nm to about 10 µm. In some examples, the pigments have a particle size ranging from about 100 nm to about 500 nm or ranging from about 100 nm to about 150 nm. The nature and the amount of the colored pigments in the second ink composition are sufficient to render a predetermined hue to the media when applied to form a printed article. The colored pigment particles are present in an amount required to produce the desired color, contrast and readability. The nature of the colored pigment is also dependent on the nature of the metal oxide and on the nature of the ink-receiving layer, for example. Adjusting the amount of the colored pigment, in the second ink composition, allows controlling the hue of the printed article resulting from the printed method as described herein In some examples, the pigments can be present, in the second ink composition, an amount ranging from about 0.1 to about 10 percentage by weight (wt %) or in an amount ranging from about 0.2 to about 6 wt % by total weight of the second ink composition. In some other examples, the pigments is present in an amount ranging from about 0.3 to about 4 wt % by total weight of the second ink composition.

Liquid Vehicle and Other Ingredient of the First and Second Ink Compositions

As disclosed herein, the first ink composition, that contains metal oxide particles, and the second ink composition, that contains colored pigments, are both dispersed in a liquid vehicle. "Liquid vehicle" is defined to include any liquid composition that is used to carry metal oxide particles or pigments to the media substrate. A wide variety of liquid vehicle components may be used herein. Such vehicle may include a mixture of a variety of different agents, including without limitation, surfactants, solvent and co-solvents, buffers, biocides, viscosity modifiers and water. Both the first and the second ink compositions encompass, thus, a liquid vehicle that can be chosen independently. In some examples, the liquid vehicle is an inkjet liquid vehicle.

Organic solvents can be part of the liquid vehicle. Suitable organic solvents include polar solvents such as amides, esters, ketones, lactones and ethers. Examples of organic solvents also include N-methylpyrrolidone (NMP), dimethyl sulfoxide, sulfolane, and glycol ethers. The solvent can be used in an amount representing from about 0.1 to about 30 wt % of the ink composition or can be used in an amount representing from about 8 to about 25 wt % of the ink composition. The ink compositions can include water. Such water can be used as the ink carrier for the composition and can be part of the liquid vehicle. The water can make up the balance of the ink composition, and may be present in an amount representing from about 40 to about 95% by weight of the total composition. In addition to water, various types of agents may be employed in the ink composition to optimize the properties of the ink for specific applications.

Surfactants can also be used in the first and in the second ink compositions and may include, for example, anionic surfactants such as, for example, sodium dodecylsulfate, sodium dodecyloxysulfonate and sodium alkylbenzenesulfonate; cationic surfactants such as, for example, cetylpyridinium chloride, trimethylcetylammonium chloride and tetrabutylammonium chloride; and nonionic surfactants such as, for example, polyoxyethylene nonylphenyl ether, polyoxyethylene naphthyl ether and polyoxyethylene octylphenyl ether. Other surfactants include, but are not limited to, amphoteric surfactants, silicon-free surfactants, ethoxylated surfactants, fluorosurfactants, alkyl polyethylene oxides, alkyl phenyl polyethylene oxides, polyethylene oxide block copolymers, and polysiloxanes, for example, and combinations thereof. If used, the surfactant can be present at a level ranging from about 0.001 to about 10 wt %, or at a level ranging from about 0.01 to about 3 wt % of the ink composition.

Biocides and anti-foaming agents can also be used in the first and in the second ink compositions. Examples of suitable biocides include, but are not limited to, benzoate salts, sorbate salts, commercial products such as Nuosept® (Ashland Special Ingredients, Wayne N.J.), Ucarcide® (Dow Chemical Company, Midland Mich.), Vancide (R. T. Vanderbilt Company, Inc., Norwalk Conn.), Proxel® (Avecia OligoMedicines, Inc., Milford Mass.), and Kordek® MLX (Dow Chemical Company), for example. Such biocides may be contained in amount representing less than about 5 weight percentage of the ink composition. Examples of commercially available anti-foaming agents include, but are not limited to, FOAMEX® 800, FOAMEX® 805, FOAMEX® 845, FOAMEX® 842, FOAMEX® 835, (all available from Evonik Tego Chemie Service GmbH, Essen, Germany) and TWIN® 4000 (Evonik Tego Chemie Service GmbH); BYK® 019, BYK® 028, BYK® 029 (available from BYK Chemie GmbH, Wesel, Germany); and SURFYNOL® 104PG50, SURFYNOL® MD30 (all available from Air Products and Chemicals, Inc., Allentown Pa.), for example.

The pH of the both the first and second ink composition can be, independently, in the range of about 3 to about 11. In some examples, the pH of the ink is from about 5 to about 10 and, in some other examples, from about 5.5 to about 7.5. The pH of the ink composition may be adjusted by addition of organic or inorganic acids or bases, i.e. adjusting agent. Both the first and second ink composition can have, independently, a viscosity within the range of about 1.0 to about 10 cps, or within the range of about of about 1.0 to about 7.0 cps, as measured at 25° C., in order to achieve the desired theological characteristics.

Printable Media

The printable media (101) used in the above mentioned printing method contains a bottom supporting substrate (110) and an ink-absorbing layer (120). Said ink-absorbing layer (120) has pore diameters that are smaller than the average size of the metal oxide pigment particles, present in the first ink composition and that are smaller than the average size of the colored pigments present in the second ink composition. Said ink-absorbing layer (120) is thus capable of absorbing the liquid phases of the first and of the second ink composition while retaining the metal oxide and pigmented particles on the media surface. Without being linked by any theory, it is believed that such sucking action of the ink-absorbing layer (120) forces the metal oxide particles to form a thin smooth metal oxide layer (130). The sucking action of the ink-absorbing layer (120) forces also the colored pigments to form a colored pigment layer (140) either directly above the ink-absorbing layer (120), when the second ink composition is jetted first, or above the metal oxide layer (130), when the first ink composition is jetted first.

Said ink-absorbing layer (120) has pore diameters that are smaller than 300 nm; in some examples, that are smaller than 100 nm; in some other examples that are smaller than 10 nm. In some examples, the ink-absorbing layer (120) has an absorption capacity (porosity) ranging from about 0.6 to about 1.2 liter/gram. In some other examples, the porous ink-absorbing layer (120) has a coat-weight in the range of about 10 to 40 g/m$^2$ or in the range of about 15 to about 30 g/m$^2$.

The ink-absorbing layer (120) can include inorganic pigments in particulate form and, at least, one binder. Suitable inorganic pigments include metal oxides and/or semi-metal oxides particles. The inorganic semi-metal oxide or metal oxide particles may be independently selected from silica, alumina, boehmite, silicates such as aluminum silicate, magnesium silicate and the like), titania, zirconia, calcium carbonate, clays, or combinations thereof. The inorganic pigment can be fumed alumina, or fumed silica. The inorganic particles pigments can include any number of inorganic oxide groups including, but not limited to silica and/or alumina, including those treated with silane coupling agents containing functional groups or other agents such as aluminum chloro-hydrate (ACH) and those having oxide/hydroxide. If silica is used, it can be selected from the following group of commercially available fumed silica: Cab-O-Sil®M-150, Cab-O-Sil®M-5, Cab-O-Sil®MS-55, Cab-O-Sil®MS-75D, Cab-O-Sil®H-5, Cab-O-Sil®HS-5, Cab-O-Sil®EH-5, Aerosil®150, Aerosil®200, Aerosil®300, Aerosil®350 and/or Aerosil®400. The aggregate size of the fumed silica can be from approximately 50 to 300 nm in size. The Brunauer-Emmett-Teller (BET) surface area of the fumed silica can be from approximately 100 to 400 square meters per gram. The inorganic particles pigments can be alumina (modified or unmodified). The alumina coating can comprise pseudo-boehmite, which is aluminum oxide/hydroxide ($Al_2O_3 n\ H_2O$ where n is from 1 to 1.5). Commercially available alumina particles can also be used, including, but not limited to, Sasol Disperal®HP10, Disperal®HP14, boehmite, Cabot Cab-O-Sperse®PG003 and/or CabotSpectrA1®81 fumed alumina. In some examples, the ink-absorption layer (120) contains fumed silica or fumed alumina that are aggregates of primary particles that have an average particle size ranging from about 120 nm to about 250 nm. The amount of inorganic pigment may be from about 30 to 90 by weight (wt %) based on the total weight of the ink-absorbing layer. A binder can be added to the ink-absorption layer (120) to bind the particulates together. In some examples, the binders are water-soluble polymers and polymer latexes. Examples of binders, for use herein, include, but are not limited to polyvinyl alcohols and water-soluble copolymers thereof, e.g., copolymers of polyvinyl alcohol and poly(ethylene oxide) or copolymers of polyvinyl alcohol and polyvinylamine; cationic polyvinyl alcohols: aceto-acetylated polyvinyl alcohols; polyvinyl acetates; polyvinyl pyrrolidones including copolymers of polyvinyl pyrrolidone and polyvinyl acetate; gelatin; silyl-modified polyvinyl alcohol; styrene-butadiene copolymer; acrylic polymer latexes; ethylene-vinyl acetate copolymers; polyurethane resin; polyester resin; and combination thereof. In some examples, the binder is polyvinylalcohol with percentage hydrolysis between 80 to 90% and 4% viscosity higher than 30 cps at 25° C., Examples of binders include Poval®235, Mowiol®56-88, Mowiol®40-88 (products of Kuraray and Clariant). In some examples, the binder may be present in an amount representing of about 5 wt % to about 30 wt % by total weight of the ink-absorbing layer (120).

The printable media (101) contains a supporting substrate (110) that acts as a bottom substrate layer. The ink-absorbing layer (120) forms a coating layer on said supporting substrate (110) and, in other word, forms a recording material that is well adapted for inkjet printing device. The supporting substrate (110) may take the form of a sheet, a web, or a three-dimensional object of various shapes. The supporting substrate (110) can be of any type and size. The supporting substrate (110) can be any material that will be able to provide a mechanical support to the above mentioned layers. In some examples, the supporting substrate can be a flexible film or a rigid paper substrate. As non-limiting examples, the supporting substrate (110) may be selected from cellulosic or synthetic paper (coated or uncoated), cardboard, polymeric film (e.g. plastic sheet like PET, polycarbonate, polyethylene, polypropylene), fabric, cloth and other textiles. The bottom substrate layer may be single material plastic film made from PET, polyimide or another suitable polymer film with adequate mechanical properties. In some examples, the supporting substrate (110) includes any substrate that is suitable for use in digital color imaging devices, such as electrophotographic and/or inkjet imaging devices, including, but in no way limiting to, resin coated papers (so-called photobase papers), papers, overhead projector plastics, coated papers, fabrics, art papers (e.g. water color paper), plastic film of any kind and the like. The substrate includes porous and non-porous surfaces. In some examples, the supporting substrate (110) is paper (non-limitative examples of which include plain copy paper or papers having recycled fibers therein) or photopaper (non-limitative examples of which include polyethylene or polypropylene extruded on one or both sides of paper) and/or combinations thereof The supporting substrate (110) can be a photobase. Photobase is a coated photographic paper, which includes a paper base extruded one or both sides with polymers, such as polyethylene and polypropylene. Photobase support can include a photobase material including a highly sized paper extruded with a layer of polyethylene on both sides. In this regard, the photobase support is an opaque water-resistant material exhibiting qualities of silver halide paper. In some examples, the photobase support includes a polyethylene layer having a thickness of about 10 to 24 grams per square meter ($g/m^2$ or gsm). The photobase support can also be made of transparent or opaque photographic material.

In some examples, the ink-absorbing layer (120) is disposed on the supporting substrate (110) and forms a coating layer having a coat weight which is in the range of about 10 to about 75 gram per square meter ($g/m^2$ or gsm) per side. In some examples, the supporting substrate (110) has a thickness along substantially the entire length ranging between about 0.025 mm and about 0.5 mm.

In some examples, the printable medium can include a glossy porous layer (150). Said layer (150) is a protective porous layer that could be applied above the ink-absorbing layer (120). When present, the glossy protective layer (150) is a porous layer having pore diameters that are smaller than the average size of the metal oxide particles present in the first ink compositions and smaller than the average size of the colored pigments present in the second ink composition. In some examples, the coat weight of the glossy layer (150) can be from about 0.1 $g/m^2$ to about 2 $g/m^2$. The glossy layer (150) can contain inorganic colloidal particles such as colloidal particles of metal oxides and semi-metal oxides or colloidal silica particles and water-soluble binders, such as polyvinylalcohol or copolymers of vinylpyrrolidone. The average particle size, as measured by diameter, of the inorganic colloidal particles, can be from about 5 nm to about 150 nm. Inorganic colloidal particles can be selected from the group consisting of silica, clay, kaolin, calcium carbonate, talc, titanium dioxide and zeolites. In some examples, the inorganic colloidal particles are colloidal silica particles. The glossy porous layer (150) can contain binders. Such binders can be polyvinylalcohol or copolymer of vinylpyrrolidone.

The preceding description has been presented only to illustrate and describe embodiments of the present disclosure. However, it is to be understood that the following are only illustrative of the application of the principles of the present articles and methods.

EXAMPLES

Example 1

Ink Compositions

A first ink composition A is prepared based on dispersions containing $Fe_3O_4$ nanoparticles. The dispersion is produced by milling nanoparticle $Fe_3O_4$ powder (Inframat Advanced Materials, Manchester Conn.) in a Ultra Apex Mill® UAM-015 (Kotobuki Industries Co., LTD, Kure, Japan) with a dispersant, Silquest®A1230 (Momentive Performance Materials, Columbus Ohio) at a dispersant/metal oxide particles ratio equal to 0.5. The resulting dispersion contains about 5.5 wt % of $Fe_3O_4$ particles. The average particle size of the $Fe_3O_4$ particles is about 32 nm as measured by a Nanotrack® particle size analyzer (Microtrac Corp., Montgomeryville Pa.). The dispersion is then used to produce the first ink composition A as summarized in TABLE 1. Second ink compositions B1, B2 and B3 are based on cyan, magenta and yellow pigments, and are prepared as summarized in TABLE 1.

TABLE 1

| Ink Formulation # | A | B1 | B2 | B3 |
|---|---|---|---|---|
| $Fe_3O_4$ Dispersion | 36.20 | — | — | — |
| LEG-1 | 5.00 | 2.00 | 1.00 | 2.00 |
| 2-Pyrrolidinone | 9.00 | 7.00 | 2.00 | 7.00 |
| 1-(2-Hydroxyethyl)-2-pyrrolidone | — | 8.00 | 8.00 | 8.00 |
| 1,6-Hexanediol | — | 3.00 | 3.00 | 3.00 |
| Tetraethylene glycol | — | 3.00 | 3.00 | 3.00 |
| Trizma ® Base | — | — | — | — |
| Proxel ® GXL | 0.10 | 0.10 | 0.10 | 0.10 |
| Surfynol ® 465 | 0.20 | — | — | — |
| Surfynol ® SEF | — | 0.75 | 0.75 | 0.60 |
| Joncryl ® 683 (K salt) | — | 0.20 | 0.20 | 0.20 |
| Crodafos ® N-3 acid | — | 1.00 | 0.75 | 1.00 |
| Zonyl ® FSO | — | 0.10 | 0.10 | 0.10 |
| IJX 613L (Cyan pigment) | — | 2.50 | — | — |
| IJX 564G (Magenta pigment) | — | — | 4.50 | — |
| IJX 635E (Yellow pigment) | — | — | — | 3.25 |
| Water | Up to 100% | Up to 100% | Up to 100% | Up to 100% |

LEG-1 is a branched ethylene glycol (available from Liponics Technologies, West Sacramento Calif.). Proxel®GXL is a biocide (available from Arch Chemicals, Norwalk Conn.). Surfynol®465 and Surfynol®SFE are surfactants from Air Products and Chemicals, Inc., Allentown Pa. Joncryl® 683 is an acrylic resin available from Johnson Wax, Crodafos® N-3 acid is available from Croda Inc. Zonyl® FSO is a fluorosurfactants available from Dupont Inc. IJX 613L is a cyan pigment, IJX 564G is a magenta pigment and IJX 635E is a yellow pigment available from Cabot.

Example 2

Printable Media

A printable recording medium is produced with a single pass (wet-on-wet) coating method using a curtain coater. The ink-absorbing layer and, eventually, a glossy layer are applied onto a photobase ("HP Advanced PhotoPaper") as supporting substrate (166 or 171 g/m² raw base paper). The ink-absorbing layer is applied first to the front side of the photo paper with a roller coater. When present, the glossy layer is coated on the top of the ink-absorbing layer. The coat weight of the ink absorbing layer is from 10 to 40 gsm and the coat weight of the glossy layer is from 0.1 to 2 gsm. The formulations of the different coating layers are expressed in the TABLE 2 below. Each number represent the part per weight of each components present in each layer.

TABLE 2

| Layer | Ingredients | Media (a) | Media (b) |
|---|---|---|---|
| Glossy protective layer | Disperal ® HP-14 | 75 | — |
| | Cartacoat ® K303C | 25 | — |
| | PVA 2 | 11 | — |
| Coat-weight | | 0.5 gsm | — |
| Ink-absorbing layer | Treated Silica | 100 | 100 |
| | PVA 1 | 21 | 21 |
| | Boric Acid | 2.5 | 2.5 |
| | Silwet ® L-7600 | 0.5 | 0.5 |

TABLE 2-continued

| Layer | Ingredients | Media (a) | Media (b) |
|---|---|---|---|
| | Glycerol | 1.5 | 1.5 |
| | Zonyl ® FSN | 0.1 | 0.1 |
| Coat-weight | | 28 gsm | 28 gsm |

Treated silica is Cab-O-Sil®MS-55 (available from Cabot) treated with ACH and Silquest®A-1110. PVA 1 is Poval®235 available from Kuraray. PVA 2 is Mowiol® 40-88 available from Kuraray. Zonyl®FSN is a fluorosurfactants available from DuPont Inc. Cartacoat®K303C is cationic colloidal silica available from Clariant. Disperal®HP-14 is boehmite available from Sasol technologies Inc. Silwet®L-7600 is a surfactant from GE silicone Inc.

Example 3

Printing Methods

Ink compositions A and B1, B2 and B3, such as described in TABLE 1, are printed on print media (a) and (b), such as described in TABLE 2. Two printing methods I and II are performed. The printer used is a HP Officejet Pro®8000 (Hewlett Packard, Palo Alto, Calif.). The methods encompass a single pass printing of 20 inch per second. Two printing methods I and II are performed.

In method I, the ink composition A is jetted first and then the ink composition B1, B2 or B3 is jetted on the same area, using the same technique, in a separate pass (or on the same printhead carriage pass.) Ink A goes down first and time lapse between jetting both inks is long enough to enable formation of separate layers on the surface of print. In method II, the ink composition B1, B2 or B3 is jetted first and, then, the ink composition A is jetted, on the same area, in a separate pass (or in the same printhead carriage pass), Ink B goes down first and time lapse between jetting both inks is long enough to enable formation of separate layers on the surface of print.

The resulting printed articles, produced by the different methods described above, are studied by analyzing Photographs (200× magnification). In both methods, the resulting printed articles have enhanced colored metallic appearances.

Examples 4

Printed Articles

The ink composition A, as illustrated in example 1, containing $Fe_3O_4$ nanoparticles, is applied onto the media (b), as illustrated in example 2. The ink composition B2, containing magenta pigments, is then applied in top of it, using a HP Officejet Pro®8000 (Hewlett Packard, Palo Alto, Calif.). The resulting printed article has a gold-like metallic appearance and a slight "warm" magenta coloration. That effect visually enhances, in some way, the gold appearance of the printed article. The effect of light, on this printed article, is illustrated in FIG. 6: the incident light (310) is slightly scattered/reflected off via the pigment-based magenta layer (140) resulting in reflected red light (322). A significant part of the incident light (310) is directionally reflected from the metal oxide coating layer (130) interface resulting in blue-grey reflected light (321). Therefore, most of the directionally reflected light (322) is passing through a "magenta" filter resulting, thus, in a rather "warm" magenta coloration and a gold-like appearance of the printed article (100).

The ink composition B2, as illustrated in example 1, containing magenta pigments, is applied onto the media (b), as illustrated in example 2. The ink composition A, containing $Fe_3O_4$ nanoparticles, is, then, applied in top of it, using a HP Officejet Pro®8000 (Hewlett Packard, Palo Alto, Calif.). The resulting printed article has a silver-like metallic appearance and a light blue-grey coloration. The effect of light on this printed article is illustrated in FIG. 7: a significant portion of the incident light (310) is reflected off the metal oxide coating layer surface (130), mainly because of the smaller metal oxide ($Fe_3O_4$) particle size and higher reflectivity, resulting in a reflected blue-grey light (321). Only a fraction of the incident light (310) makes through the semi-transparent metal oxide coating layer (130) and is reflected off the colored pigment layer interfaces, resulting in grey reflected light (321) and red reflected light (322). Light specularly reflected off said print surface has thus a much "weaker magenta" component and coloration.

The invention claimed is:

1. A method for producing printed articles comprising:
   a. providing a first ink composition that contains metal oxide particles with an average particle size in the range of about 3 to about 300 nm;
   b. providing a second ink composition that contains colored pigment particles dispersed in an ink vehicle;
   c. providing a printable media having a bottom supporting substrate and an ink-absorbing layer with pore diameters that are smaller than the size of metal oxide pigment particles and colored pigment particles;
   d. and sequentially applying, on the same print area, the first and the second ink compositions onto said printable media.

2. The method of claim 1 wherein the first ink composition is applied before the second ink composition on the same print area of the printable media.

3. The method of claim 1 wherein the first ink composition is applied after the second ink composition on the same print area of the printable media.

4. The method of claim 1 wherein the first and the second inkjet compositions are applied via inkjet printing technique.

5. The method of claim 1 wherein the metal oxide particles, that are present in the first ink composition, have an average particle size ranging from about 10 to about 100 nm.

6. The method of claim 1 wherein the metal oxide particles, that are present in the first ink composition, are iron oxide pigment particles ($Fe_3O_4$).

7. The method of claim 1 wherein the metal oxide particles, present in the first ink composition, are dispersed with polyether alkoxysilanes dispersants.

8. The method of claim 1 wherein the second ink composition comprises colored pigment particles having particle size ranging from about 100 nm to about 500 nm.

9. The method of claim 1 wherein the second ink composition comprises colored pigment particles in an amount ranging from about 0.1 to about 10 wt % by total weight of the second ink composition.

10. The method of claim 1 wherein the printable media further includes a glossy porous layer above the ink-absorbing layer.

11. A printed article, resulting from the printing method of claim 1, comprising a printable media on which a printed feature has been formed by sequentially applying, on the same print area, a first and a second ink composition, wherein:
   a. said first ink composition contains metal oxide particles that have an average particle size in the range of about 3 to about 300 nm and forms a metal oxide coating layer;
   b. said second ink composition contains colored pigment particles dispersed in an ink vehicle and forms a colored pigment layer;
   c. and wherein said printable media contains a bottom supporting substrate and an ink-absorbing layer with pore diameters that are smaller than the size of metal oxide pigment particles and colored pigment particles.

12. The printed article of claim 11 wherein
   a. the first ink composition forms a metal oxide coating layer at the surface of the ink-absorbing layer of the printable media;
   b. and wherein the second ink composition forms a colored pigment layer above the metal oxide coating layer.

13. The printed article of claim 11 wherein
   a. the second ink composition forms a colored pigment layer at the surface of the ink-absorbing layer of the printable media;
   b. and wherein the first ink composition forms a metal oxide coating layer above the colored pigment layer.

14. The printed article of claim 11 wherein the first ink composition forms, onto the printable media, a metal oxide coating layer that has a thickness that is between about 1 nm and about 600 nm.

15. The printed article of claim 11 wherein the second ink composition forms, onto the printable media, a colored pigment layer that has a thickness that is between about 1 nm and about 600 nm.

* * * * *